United States Patent Office 3,278,535
Patented Oct. 11, 1966

3,278,535
POLYACYLATED PYRIMIDINE DERIVATIVES
Irwin J. Pachter, Woodbury, N.Y., assignor to Smith Kline & French Laboratories, Philadelphia, Pa., a corporation of Pennsylvania
No Drawing. Original application Aug. 7, 1962, Ser. No. 215,293, now Patent No. 3,159,629, dated Dec. 1, 1964. Divided and this application Oct. 7, 1964, Ser. No. 402,335
3 Claims. (Cl. 260—256.4)

This application is a divisional of my copending application, Serial No. 215,293, filed August 7, 1962, now Patent No. 3,159,629, which is a continuation-in-part of my copending application, Serial No. 188,847, filed April 19, 1962, now Patent No. 3,238,206.

This invention relates to novel polyacylated 6-amino-5-nitrosopyrimidine derivatives of use as valuable intermediates. This invention also relates to processes using said derivatives by condensation with certain organic compounds containing an activated methylene group capable of forming a nucleophilic anion to form pteridines having valuable pharmacodynamic activity such as diuretic and antihypertensive activity.

It is known to the art that certain 5-nitroso-6-aminopyrimidines have use as starting materials for the synthesis of pteridines. When these pyrimidines have an amino or hydroxyl group in either or both the 2,4-positions, condensations with compounds which form weakly nucleophilic anions such as benzoylacetonitrile or phenylacetaldehyde proceed in very poor yield. Often the product is present in such small yield that ordinary isolation procedures fail. Otherwise using compounds which form relatively strong nucleophilic anions such as acetonitrile or cyanoacetamide often very vigorous reaction conditions are necessary for condensation thereby often leading to decomposition of the end product pteridines.

This problem in the art has been solved by use of the polyacylated pyrimidine derivatives and the process of this invention as described hereafter.

The pyrimidines of this inventon are polyacylated derivatives of compounds having the following structural formula:

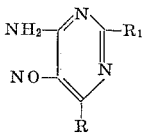

in which R and $R_1$ are hydrogen, amino, thienyl, hydroxyl, methyl, methylthio, phenyl, N-piperidinyl, N-pyrrolidinyl, N-morpholinyl or dimethylamino, at least one of R and $R_1$ is hydroxyl or preferably amino.

These pyrimidines are acylated with any convenient acyl chloride or anhydride however the nub of this invention is described hereafter by using the readily available acetyl moiety.

The pyrimidines may be di- or triacetylated depending on whether 2 or 3 amino or hydroxyl groups are present. In practice it has been found that the diacetyl derivatives even of the triamino pyrimidines give excellent results. The exact structure of the acetylated pyrimidines is not certain although it is logical that the groups acetylate in the order—6, 4 and 2. Some evidence, however, exists that one acetyl group may have esterified the tautomeric form of the 5-nitroso group to form an oximino ester. At any rate the polyacetylated compounds in the highly useful 2,4,6-triamino-7-nitrosopyrimidine series are fully described and these compounds are preferred. It is assumed hereafter that the structures are the N-acylated compounds.

The acylated pyrimidines are simply prepared from the known pyrimidines by acylation for example, with an acyl chloride or anhydride in any desired molar ratio. Most conveniently the diacetyl derivatives are prepared by reacting the pyrimidine with an excess of acetic anhydride in acetic acid carefully with stirring. When the solution turns blue and a usually blue crystalline solid separates the reaction mixture is cooled and worked up to give the desired diacetyl derivative. The triacetyl compound is prepared most conveniently by boiling the acetic anhydride-acetic acid reaction mixture gently then working up to give a green crystalline solid.

The process of this invention comprises reacting the polyacetylated 6-amino-5-nitrosopyrimidine derivatives with reactants known to the art as having an activated methylene group which reactants form nucleophilic anions capable of cyclizing upon condensation to form pteridine derivatives. Exemplary of such active methylene compounds are those chemically stable, isolable derivatives represented by the following structural formula:

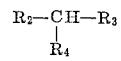

in which $R_2$, $R_3$, and $R_4$ are hydrogen, methyl, benzyl, cyclohexyl, cyclohexylmethyl, phenyl, thienyl, acetyl, cyano, formyl, pyridinium, benzoyl or carboxamido, at least two of which are groups other than methyl, benzyl, cyclohexyl or cyclohexylmethyl.

Many such active methylene reactants are disclosed in my copending applications but may be specifically exemplified by phenylacetonitrile, phenylacetone, phenylacetaldehyde, pyridiniumphenylacetonitrile bromide, cyanoacetamide, benzoylacetonitrile, acetonylpyridinium chloride, phenacylpyridinium bromide, α-thienylacetonitrile and the like. These compounds are also known to the art. The reaction of this invention is particularly useful using compounds which form weakly nucleophilic anions or anions which are thermally unstable such as those from benzoylacetonitrile and α-cyanobenzylpyridinium salts.

Such compounds are well known to those skilled in the art. The process of this invention with the use of polyacylated pyrimidines therefore both give better yields than do prior art methods or enables the reaction to be run at substantially lower temperatures for example using methanol or ethanol rather than the high boiling solvents such as ethoxyethanol or dimethylformamide. This is particularly of advantage with the prior art problems pointed out herebefore.

The polyacetylated pyrimidines and nucleophilic methylene compounds are reacted in the presence of an alkaline condensing agent such as an alkali metal lower alkoxide, lower carboxylate, cyanide, carbonate, etc. Preferably sodium or potassium acetate or cyanide is used. The simultaneous use of cyanide as a reactant as well as a catalyst in the cyclization reaction is described in my copending applications. The reaction is run preferably at temperatures up to the boiling point of the reaction mixture for from about five minutes up to about 12 hours. The reactivity of the nucleophilic compound has much to do with the speed of reaction as will be recognized by those skilled in the art. The reaction is usually run in an inert organic solvent in which the reactants are substantially soluble such as lower alcohols, methanol or ethanol, dimethylformamide, dimethylacetamide, ethoxyethanol or dimethyl sulfoxide. Absolute ethanol or methanol are preferred. When the reaction is carried out as described yields of from 65–75% of the desired pteridine are commonly realized.

The starting material isolated initially is usually the yellow acylated pteridine. The acyl groups are however removed almost quantitatively by slurrying in a dilute alkali solution such as in dilute sodium or potassium hydroxide unless the acyl derivatives are desired as end products. When the term "lower" is used herein the carbon content of this moiety is from 1 to 8 preferably from 1 to 2 carbons. As noted above other acyl moieties may be used in place of the illustrative acetyl group such as benzoyl, other lower alkanoyls, lower carbalkoxy, etc.

The following examples are designed to illustrate fully the operation of this invention using known starting materials but not to limit the scope of this invention.

Example 1

A mixture of 10 g. of 2,4,6-triamino-5-nitrosopyrimidine, 50 ml. of acetic anhydride and 100 ml. of acetic acid is heated on a hot plate slowly with stirring. The starting material dissolves as the mixture turns blue. As a blue precipitate forms the mixture is cooled in an ice bath. The product is separated, washed with ethanol and dried to give diacetylated 2,4,6-triamino-5-nitrosopyrimidine, M.P. 199–200° C. (dec.). The infrared absorption maxima in mull occurred at $5.68\mu$, $5.84\mu$ and $5.93\mu$.

A mixture of 20 g. of benzoylacetonitrile and 24 g. of 4,6-diacetamido-2-amino-5-nitrosopyrimidine in 350 ml. of absolute ethanol is brought to boiling at which point a solution of 14 g. of potassium acetate in 150 ml. of absolute ethanol is added. After stirring under reflux for 30 minutes the mixture is cooled to produce the yellow monoacetyl derivative of phenyl 2,4,7-triamino-6-pteridyl ketone.

This solid is stirred at room temperature for two hours under 350 ml. of 1.5% sodium hydroxide to give the desired triaminopteridine, M.P. 338–339° C. (dec.).

Example 2

A mixture of 5.0 g. of 2,4,6-triamino-5-nitrosopyrimidine, 50 ml. of acetic anhydride and 150 ml. of acetic acid is boiled gently with stirring for 10 minutes until the color of the mixture is changed from blue to green. The solution is cooled to 0° C. to separate green crystals of triacetyl 2,4,6-triamino-5-nitrosopyrimidine, M.P. 214° C. (dec.). The characteristic infrared absorption maxima occurred at $5.69\mu$, $5.79\mu$ and $5.90\mu$.

A solution of 6.0 g. of potassium acetate in 80 ml. of absolute ethanol is added to a boiling mixture of 8.4 g. of triacetyl 2,4,6-triamino-5-nitrosopyrimidine, 8.4 g. of phenylacetone and 200 ml. of absolute ethanol. After heating at reflux for 1.5 hours, the mixture is concentrated in vacuo, cooled and diluted with 4% aqueous sodium hydroxide solution. After three hours at room temperature, the mixture is neutralized with acetic acid to give 2,4-diamino-7-methyl-6-phenylpteridine, M.P. 327° C. (dec.).

Example 3

A mixture of 2 g. of 4,6-diamino-5-nitroso-2-piperidinylpyrimidine, 8 ml. of acetic anhydride and 16 ml. of acetic acid is heated at 50° C. for 15 minutes. Water (3 ml.) is added. Cooling separates diacetylated 4,6-diamino-5-nitroso-2-piperidinylpyrimidine, M.P. 185–186° C. (dec.). The characteristic infrared absorption maxima occurred at $5.78\mu$ and $5.85\mu$.

A mixture of 1.02 g. of the diacetyl compound, 1 g. of benzoylacetonitrile, 0.6 g. of potassium acetate in 30 ml. of absolute ethanol are reacted as above and heated for 10 minutes. The mixture is cooled and the acetylpteridine hydrolyzed with 0.5 g. of sodium hydroxide in water to give phenyl 4,7-diamino-2-piperidinyl-6-pteridyl ketone, M.P. 300–302° C. (dec.).

Example 4

A solution of 10 g. of diacetylated 2,4,6-triamino-5-nitrosopyrimidine in 120 ml. of dimethylsulfoxide is diluted with 400 ml. of boiling acetone, a previously heated solution of 16.6 g. of α-cyanobenzyl benzenesulfonate, 16.6 ml. of pyridine and 50 ml. of acetone, then a solution of 4.1 g. of sodium cyanide in 40 ml. of water. Yellow crystals separate and are isolated. A sample (5 g.) of the yellow crystals is boiled in methanol solution to give yellow plates of 2,4,7-triamino-6-phenylpteridine-5-oxide, M.P. 340° C. (dec.).

Example 5

A mixture of 4.8 g. of diacetylated 2,4,6-triamino-5-nitrosopyrimidine, 5.2 g. of phenylacetaldehyde, 2.0 g. of potassium acetate and 125 ml. of ethanol is heated under reflux for 2.5 hours. After cooling a solution of 2 g. of sodium hydroxide in 75 ml. of water is added. The yellow acetyl derivative dissolved upon warming and crystals slowly reformed over three hours, 2,4-diamino-6-phenylpteridine, M.P. 340° C. (dec.).

Example 6

A mixture of 16.8 g. of 4,6-diamino-2-methylthio-5-nitrosopyrimidine in acetic anhydride-acetic acid is reacted to give the diacetyl derivative which is condensed as in Example 1 to give the 2-methylthiopteridine derivative.

2,6-diamino-5-nitroso-2-phenylpyrimidine is acetylated exhaustively in an excess of acetic anhydride as described to give the diacetyl derivative which is reacted with phenylacetonitrile to give 2,7-diamino-2,6-diphenylpteridine.

4,6-diamino-5-nitrosopyrimidine is reacted to give the diacetyl derivative which is condensed with acetonyl pyridinium chloride to give 6-acetyl-4,7-diaminopteridine, M.P. 300° C. (dec.).

4,6-diamino-2-methyl-5-nitrosopyrimidine is acetylated and reacted with phenylacetone to give 6-benzoyl-4,7-diamino-2-methylpteridine, M.P. 307° C. (dec.).

2,6-diamino-4-dimethylamino-5-nitrosopyrimidine is acetylated as described and reacted with cyclohexanoylacetonitrile to give 6-cyclohexylcarbonyl-2,7-diamino-4-dimethylaminopteridine.

4,6-diamino-2-hydroxy-5-nitrosopyrimidine is converted to the triacetylated derivative as described and reacted with phenylacetone as in Example 2 to give 2-hydroxy-4-amino-6-methyl-7-phenylpteridine. 2-tolyl-4,6-diamino-5-nitrosopyrimidine and 6-α-thienyl-4,6-diamino-5-nitrosopyrimidine are similarly acetylated and reacted.

What is claimed is:

1. A diacetyl or triacetyl derivative of a chemical compound of the structure:

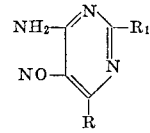

in which R and $R_1$ are members selected from the group consisting of hydrogen, amino, thienyl, hydroxyl, methyl, methylthio, phenyl, N-pyrrolidinyl, N-piperidinyl, N-morpholinyl and dimethylamino, a minimum of one of which is a member selected from the group consisting of amino and hydroxyl.

2. Diacetyl 2,4,6-triamino-5-nitrosopyrimidine.

3. Triacetyl 2,4,6-triamino-5-nitrosopyrimidine.

References Cited by the Examiner

Taylor et al.: Jour. Am. Chem. Soc., vol. 84, October 5, 1962, pages 3744–3748.

ALEX MAZEL, *Primary Examiner.*

HENRY R. JILES, *Examiner.*

MARY O'BRIEN, *Assistant Examiner.*